Feb. 20, 1934.  F. G. FOLBERTH ET AL  1,947,841
FLUID PRESSURE ACTUATED BRAKE
Filed Sept. 27, 1929
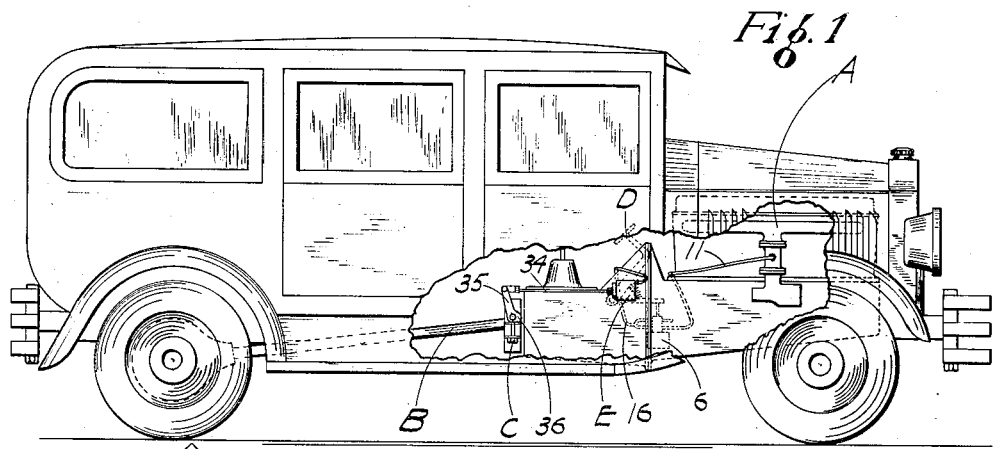
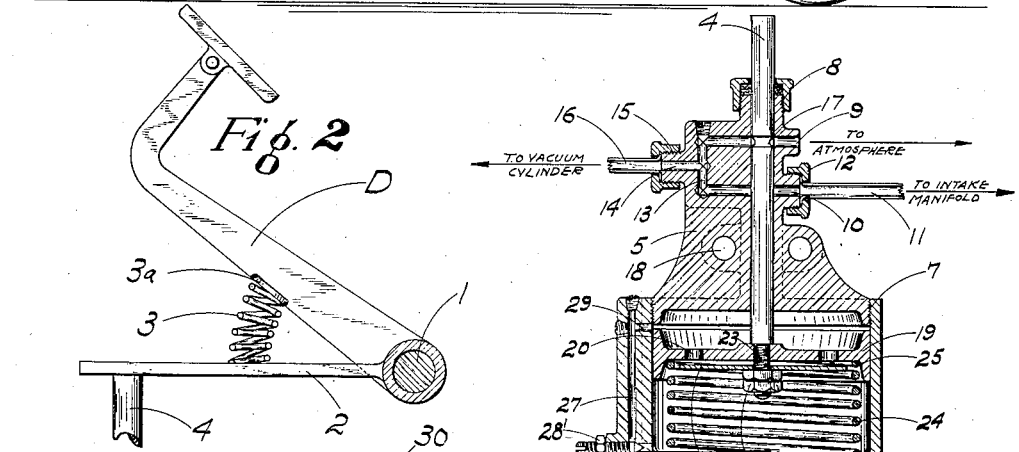
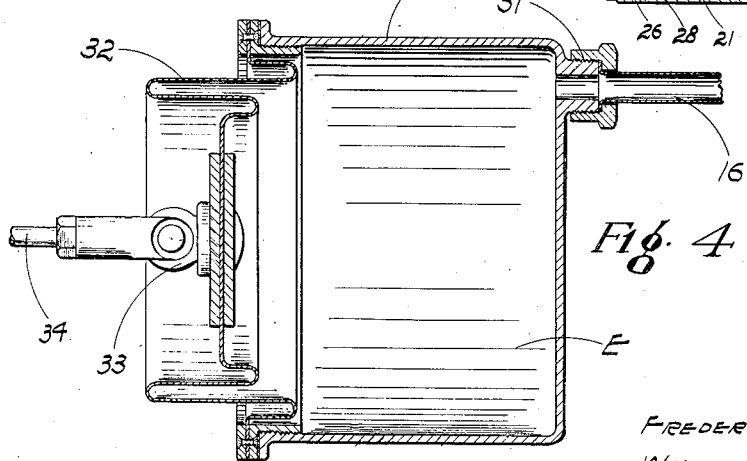
Inventor
FREDERICK G. FOLBERTH.
WILLIAM M. FOLBERTH.
By Richey & Watts
Attorney Patented Feb. 20, 1934

1,947,841

UNITED STATES PATENT OFFICE 1,947,841

FLUID PRESSURE ACTUATED BRAKE

Frederick G. Folberth and William M. Folberth, Cleveland, Ohio

Application September 27, 1929
Serial No. 395,548

22 Claims. (Cl. 192—13)

This invention has to do with the braking of motor vehicles and is primarily concerned with the provision of mechanism that automatically applies the brake of an automobile coincident with the manipulation of some other operating part by the driver.

The present invention, for the main part, is the result of recognition of the need for providing means for holding an automobile at a standstill on some slight incline, or the like, which occurs at traffic lights and other similar places. When a car is brought to a stop at such a point, and is to be started again in the immediate future, some little difficulty is often experienced by the driver in again getting the machine under way, due to the fact that he must release the foot brake, which is the means commonly availed of for stopping the car, in order to step on the accelerator pedal or button to accelerate the motor to provide the necessary power to get the car started up the incline.

With the above noted condition in mind, this invention has in view the provision of mechanism that is designed for operative association with the clutch operating pedal of an automobile. Our thought is to inter-relate the braking mechanism with the clutch pedal so that upon declutching action, the automobile will be brought to a stop and held there by the brake, which has been applied with a somewhat delayed action. This arrangement of delaying the application of the brake permits of clutching and declutching operations, which accompany the gear shifting of normal driving, without having any effect on the automatic braking mechanism. But when the clutch pedal is depressed for an appreciable length of time, such as would be the case in holding a car at a standstill while waiting for a traffic light to change, the brakes will be automatically applied to hold the car against movement.

In carrying out this thought in a practical embodiment, we propose to avail of a vacuum operating device, that is hooked up with the intake manifold of the engine so as to constitute a power means for operating the brakes, which may be the ordinary brakes of the machine. A control valve is employed in conjunction with the vacuum device and through the medium of a yielding operating connection between the clutch pedal and control valve, and a dash pot operatively associated with the valve, the desired delayed action in operating the brakes is provided for. Moreover, by the specific arrangement shown, this mechanism accomplishes a desideratum of utmost importance, which is the prompt release of the brakes upon letting out the clutch pedal. This end is attained in a manner to be hereinafter more fully set out.

These and other more detailed objects and advantages will in part become apparent and in part be hereinafter stated as the description of the invention proceeds. For a full and more complete understanding thereof, reference may be had to the following description and accompanying drawing, which is illustrative of an embodiment of our invention in a preferred and convenient form, although the invention is capable of being embodied and applied in other forms. In the drawing Figure 1 is a side view of an automobile with this invention applied thereto. Parts of the vehicle are broken away and shown somewhat diagrammatically to more clearly bring out the construction of the brake applying mechanism.

Figure 2 is a detailed side showing in elevation of the clutch pedal and operating means for the brake mechanism associated therewith.

Figure 3 is a section through the main control valve and dash pot mechanism, and Figure 4 is a section through the vacuum device that operates the brake.

Referring now to the drawing, a motor vehicle is diagrammatically illustrated in Figure 1 and comprises the usual internal combustion engine, which includes the intake manifold designated A. In the present instance, the brakes of the motor vehicle illustrated are shown as being of transmission type. It is to be understood, however, that the underlying principles of the invention are susceptible of embodiment with any of the known types of brake construction. In the illustrated form the transmission shaft is referred to as B and the brake means associated therewith generally by the reference character C.

A clutch pedal D is mounted on an operating shaft 1 in the usual manner and this shaft 1 also carries an arm 2, which is freely rotatable thereon and which arm constitutes a means for operating the brake mechanism.

A spring 3 is interposed between the pedal D and arm 2 and has one end anchored in the recess 3a in the arm D, while a similar connection occurs at the other end of the spring to the arm 2. This spring 3 provides a yielding operating connection between the parts D and 2. The arm 2 engages the top of a rod 4, which constitutes the main valve stem of the control valve hereinafter described.

The control valve and dash pot construction is clearly shown in Figure 3 and includes a main valve body member 5, the lower portion of which is threaded to a cup member 6, as shown at 7. The member 5 is provided with a vertically extending opening 8 which receives the valve stem 4. A transverse passage 9 intersects the opening 8 as does a second transverse passage at 10 below the passage 9. The latter communicates with the atmosphere while the passage 10 is connected with the intake manifold A by a conduit 11 and coupling 12. The passages 9 and 10 terminate in a vertical passageway 13, from which extends an opening 14. A coupling 15 together with a conduit 16 establishes communication between the opening 13 and the vacuum device shown at Figure 4 and referred to generally as E. The valve stem 4 is circumferentially grooved as shown at 17 and this groove constitutes a means for establishing the continuity of either of the passages 9 and 10, which ordinarily are interrupted by the valve stem 4. When the groove 9 is in alignment with either of these passages, the passage will be opened while the other one will be closed or restricted by the stem. In the body 5 is formed an opening 18, which constitutes a means for mounting the assembly on the frame of the vehicle.

Fastened to the lower end of the stem 4 by a shoulder and threaded connection, illustrated at 23, is a piston element 19 that functions as a piston in the cylinder of cup 6, which is filled with a proper hydraulic medium, such as an oil. The member 19 is formed with a plurality of openings 20, which are, under certain conditions, closed by disc 21. The latter is loosely carried by the lower reduced portion of the stem 4, which extends below the piston member 19 and this member 21 has a certain amount of free play or floating movement, which is limited by lock nuts 22, which are threaded on the lower extremity of the stem 4. When the disc 21 is positioned against the piston 19, it serves to close the openings 20, but when it is spaced away from these openings, the latter are left unrestricted and the hydraulic medium is free to flow therethrough.

A helical spring 24 is seated in a seat 25 in the piston 19 and at the lower end bears against the bottom of the cup member 6. This spring 24 constantly exerts a tendency to move the piston element 19 upwardly to its uppermost position. The cup member 6 is formed with an enlarged portion 26, which is provided with a passageway 27. A short horizontal passageway 28 at the bottom of the cup 6 establishes communication between the passageway 27 and the interior of the cup member proper. A needle valve 28' is operable to vary the size of the opening 28, thereby to control the rate of flow of fluid through these passages. Another short passage 29 communicates with the interior of the cup member 6 above the piston element 19.

The dash pot mechanism, above described, briefly operates as follows: Upon downward movement of the valve stem 4, incident to depressing of the clutch pedal D, the piston element 19 moves against the resistance offered by the hydraulic medium and the action of the latter serves to press the disc member 21 tightly against the piston element 19, whereby the openings 20 are closed. The downward movement of the piston element is therefore made against the maximum resistance of the hydraulic fluid, which must flow through the passages 27, 28 and 29 around to the space above the piston element 19. It is obvious that in order for the valve stem 4 to move downwardly into the position where the groove 17 is in alignment with the passageway 10, some little time is consumed through the retarded movement. However, upon release of the clutch pedal D, the spring 24 promptly and quickly urges the piston element 19 upwardly and the hydraulic medium is rendered substantially resistanceless by the movement of the disc 21 away from the piston element 19, leaving the openings 20 unrestricted so that the fluid may freely flow therethrough.

The vacuum device E shown in Figure 4 comprises an element having the general properties of a piston and cylinder, herein embodied as a vacuum tank 30, which is connected with the conduit 16 by the thimble coupling shown at 31. In the embodiment herein illustrated as preferred, one end of the tank 30 is collapsible, and may conveniently be formed with a bellows diaphragm 32, which may be of a well known metallic construction. This diaphragm has an operating connecting member 33, which is connected by a link 34 with one arm 35 of a bell crank 36, which constitutes a means of operating the transmission brake C. When air is exhausted from the tank E due to the alignment of the passage 10 and the groove 17 in the valve stem 4, which renders effective the exhausting action of the intake manifold to exhaust air from the tank 30, the bellows 32 collapses and, through the operating connection described, applies the brake C. However, when communication between the vacuum tank 30 and the atmosphere is established by alignment of the groove 17 and passage 9, the bellows expand and the brake C is released. A spring may be provided to assist this release if necessary.

It is also obvious that by holding the clutch pedal in an intermediate position such that the groove 17 in the valve stem 4 is not aligned with either the passage 9 or the passage 10, the brake can be held at its last setting either on or off as the case may be, thus affording the operator of the car a neutral zone giving greater range of possibilities in the use of the brake than he would otherwise have.

It is to be understood that the scope of our invention is not limited to the showing and description herein of a preferred form, but that the principles thereof may be embodied in a variety of forms, the elements of the mechanism being susceptible of modification in whatever manner may be most appropriate or desirable to meet conditions of actual practice.

What we claim is:

1. In mechanism of the class described, the combination, with a brake and a clutch operating member, of resilient operating connections between the brake and clutch operating members, said connections including means for delaying the application of the brake incident to operation of the clutch operating member.

2. Mechanism of the class described, comprising, in combination, a brake, a power actuated device for applying the brake to render it effective, control means governing the operation of the said device to apply the vehicle brake, a clutch operating pedal, and a yieldable resilient connection between the control means and clutch pedal whereby disengaging movement of the clutch pedal will operate said control means to cause application of the brake.

3. Brake operating mechanism, comprising, in combination, a vacuum operating device for operating a brake of a motor vehicle, a control valve for governing the operation of the vacuum device, said control valve including a valve stem, and a dash pot associated with the valve stem for retarding its movement in one and only one direction.

4. In mechanism of the class described, the combination, with a brake and a clutch operating member, of operating connections between the brake and clutch operating members, said connections including a spring and dash pot which are associated with one another to provide for a delayed action in brake applying operations.

5. Mechanism of the class described, comprising, in combination, a brake, a device for applying the brake to render it effective, control means governing the operation of the said device, a clutch operating pedal, a spring between the clutch pedal and the control means establishing a yieldably operating connection between these parts, and a dash pot also associated with the control means.

6. Brake operating mechanism comprising a cylinder, means for exhausting the cylinder, a conduit extending from the cylinder to a control valve mechanism, said valve including a passageway communicating with the atmosphere and a passageway leading to the exhausting means, a valve stem adapted to assume position closing one of the passageways and at the same time leaving the other free, and vice versa, and a dash pot operatively associated with the valve stem.

7. Mechanism of the class described, comprising, in combination, a brake, a device for applying the brake to render it effective, control means governing the operation of the said device, means affecting the control device to retard application of the brake, a clutch operating pedal, and a yieldable connection between the control means and clutch pedal constituting a means for storing up energy incident to depression of the clutch pedal to affect the retarding means in a continuous manner to slowly apply and maintain application of the brake.

8. In mechanism of the class described, the combination, with a brake and a clutch operating member, of operating connections between the brake and clutch operating members, said connections including a spring and dash pot which are associated with one another to provide for a delayed action in brake applying operations, and a prompt release of the brake coincident with release of the clutch operating member.

9. Brake operating mechanism, comprising, in combination, a device for operating a brake of a motor vehicle, control means associated with the last mentioned device and controlling the operation thereof, and yielding means operatively connecting the control means with the clutch pedal of the vehicle on which the mechanism is mounted.

10. The combination, with a brake of a motor vehicle, of a bell crank for applying the brake, a vacuum device including a cylinder, connections between the cylinder and the intake manifold of the engine whereby the cylinder may be exhausted, a valve controlling communication through the said connections, and a control member for the valve operatively connected with the clutch pedal of the vehicle whereby movement of the clutch pedal in clutch disengaging direction will open said connections between said cylinder and said manifold.

11. Means for controlling the operation of a motor vehicle including a clutch between the prime mover and the driving wheels, a lever for operating said clutch, means for creating a partial vacuum, a brake-applying cylinder, channels adapted to connect said cylinder selectively with said vacuum-creating means or with the atmosphere, valve means in said channels, and lost-motion connections between said clutch lever and said valve means whereby movement of said valve means to connect the cylinder to the vacuum creating means will occur after the clutch lever has been moved to disengage the vehicle clutch.

12. In mechanism of the class described, the combination, with a fluid pressure actuated brake member and a clutch operating member, of operating connections between the brake member and clutch operating member, said connections including means for delaying the action of the brake incident to operation of the clutch operating member.

13. Brake operating mechanism, comprising, in combination, a vacuum operating device for controlling a brake of a motor vehicle, a control valve for governing the operation of the vacuum device, said control valve including a valve stem, and means for retarding movement of the valve stem in one direction.

14. Brake operating mechanism for automotive vehicles having a clutch pedal, comprising, in combination, a fluid pressure actuated device for applying a brake of a motor vehicle, a control valve adapted to be operated by movement of the vehicle clutch pedal for controlling the operation of said fluid pressure actuated device and means, associated with said valve, for resisting movement of said valve in a direction to apply the brake.

15. Brake operating mechanism comprising, in combination, a fluid pressure actuated device for operating a brake of a motor vehicle, a control valve for governing the operation of said fluid pressure actuated device, and adjustable means, associated with the valve, for retarding its movement in one and only one direction.

16. In an automotive vehicle the combination of a brake, fluid pressure actuated means for applying said brake, a clutch operating pedal and a valve for controlling the operation of said fluid pressure actuated means, said valve being adapted to be operated by movement of said clutch pedal in clutch disengaging direction to apply the vehicle brake.

17. In an automotive vehicle the combination of a fluid pressure actuated brake, a clutch controlling pedal, a valve for controlling said fluid pressure actuated brake, and means for causing said valve to move in a direction to apply the brake during movement of said clutch pedal in clutch disengaging direction.

18. Fluid pressure brake operating mechanism including in combination, a cylinder, means for partially exhausting said cylinder, a conduit extending between said exhausting means and said cylinder, a control valve in said conduit, said valve including a passageway communicating with the atmosphere and a passageway leading to the exhausting means and being adapted to assume a position closing one of said passageways and at the same time leaving the other free, and vice versa, and a dash pot operatively associated with said valve.

19. Brake operating mechanism including, in combination, a fluid pressure actuated device for operating a brake of a motor vehicle and control means, associated with said brake operating device, for controlling the operation thereof, said control means including a valve adapted to be actuated by movement of the vehicle clutch pedal in clutch disengaging direction to cause application of the brake.

20. In an automotive vehicle, the combination of a fluid pressure actuated brake, a clutch pedal, and valve means actuated by movement of said clutch pedal in clutch disengaging direction for controlling the application of said brake.

21. In an automotive vehicle the combination of a brake, fluid pressure actuated means for applying said brake, a clutch operating member and a valve for controlling the operation of said fluid pressure actuated means, said valve being adapted to be operated by movement of said clutch operating member in clutch disengaging direction to apply the vehicle brakes.

22. In an automotive vehicle, the combination of a fluid pressure actuated brake, a clutch operating member, and valve means actuated by movement of said clutch operating member in clutch disengaging direction for controlling the application of said brake.

FREDERICK G. FOLBERTH.
WILLIAM M. FOLBERTH.